United States Patent [19]

Holeva

[11] Patent Number: 5,710,830
[45] Date of Patent: Jan. 20, 1998

[54] METHOD OF AND APPARATUS FOR SEGMENTING FOREGROUND AND BACKGROUND INFORMATION FOR OPTICAL CHARACTER RECOGNITION OF LABELS EMPLOYING SINGLE LAYER RECURRENT NEURAL NETWORK

[75] Inventor: Lee F. Holeva, Gurnee, Ill.

[73] Assignee: United Parcel Service, Atlanta, Ga.

[21] Appl. No.: 574,254

[22] Filed: Nov. 30, 1995

Related U.S. Application Data

[63] Continuation-in-part of Ser. No. 318,352, Oct. 5, 1994, abandoned.

[51] Int. Cl.$^6$ .................................................... H04N 1/40
[52] U.S. Cl. .................................... 382/173; 358/464
[58] Field of Search ................................ 382/173, 282; 358/464

[56] References Cited

U.S. PATENT DOCUMENTS

| | | | |
|---|---|---|---|
| 4,509,195 | 4/1985 | Nadler | 382/51 |
| 4,550,435 | 10/1985 | Hayman | 382/9 |
| 4,589,141 | 5/1986 | Christian et al. | 382/14 |
| 4,941,122 | 7/1990 | Weideman | 395/807 |
| 5,091,965 | 2/1992 | Kobayashi et al. | 382/15 |
| 5,093,803 | 3/1992 | Howard et al. | 364/807 |
| 5,129,040 | 7/1992 | Hanazato et al. | 395/25 |
| 5,140,670 | 8/1992 | Chua et al. | 395/24 |
| 5,162,899 | 11/1992 | Naka et al. | 358/80 |
| 5,168,352 | 12/1992 | Naka et al. | 358/81 |
| 5,179,596 | 1/1993 | Weingard | 382/15 |
| 5,216,751 | 6/1993 | Gardner et al. | 395/27 |
| 5,218,440 | 6/1993 | Mathur | 358/213.27 |
| 5,239,593 | 8/1993 | Wittner et al. | 382/14 |
| 5,245,672 | 9/1993 | Wilson et al. | 382/9 |
| 5,248,873 | 9/1993 | Allen et al. | 250/208.1 |
| 5,257,343 | 10/1993 | Kyuma et al. | 395/22 |
| 5,274,744 | 12/1993 | Yu et al. | 395/24 |
| 5,583,659 | 12/1996 | Lee et al. | 358/464 |
| 5,630,037 | 5/1997 | Schindler | 382/282 |

OTHER PUBLICATIONS

L.F. Holeva, Foreground–Background Segmentation of OCR Labels by a Single Layer Recurrent Neural Network–Unpublished.

P.L. Kienker, T.J. Sejnowski, G.H. Hinton, L.H. Schumacher, Separating figure from ground with a parallel network, Perception, vol. 15, pp. 197–216, 1986.

T. Poggio, E.B. Gamble, J.J. Little, Parallel Integration of Vision Modules, Science, vol. 242, pp. 436–440, 1988.

L.F. Holeva, N.Kadaba, An Image Filtering Module using Neural Networks for an Optical Character Recognizing System, Math, Modeling and Sci. Computing, pp. 504–510, Principia Scientia, 1993.

(List continued on next page.)

Primary Examiner—Edward L. Coles, Sr.
Assistant Examiner—Stephen Brinich
Attorney, Agent, or Firm—Jones & Askew, LLP

[57] ABSTRACT

A method and apparatus for processing a greyscale input of an image, particularly of a shipping label, into a binary output image in which foreground information is segmented from the background information and contrasts between adjacent regions having different background densities are obliterated is described. A neuron employing a 5×5 input neighborhood having a unique neuron activation function is shown. No explicit line process is employed. Output is biased toward a particular one of the output values by employing non-linear feedback as a function of both the grey scale value for the pixel corresponding to the label site being updated and the most recent value of the label site. The otherwise strong contribution from a gradient term in the energy function is suppressed by a shunting inhibition when the shunting inhibition function detects that the pixel lies on or near a boundary between adjacent regions of differing background intensities.

12 Claims, 9 Drawing Sheets

OTHER PUBLICATIONS

M.M. Menon, An Efficient MRF Image–Restoration Technique Using Deterministic Scale–Based Optimization, The Lincoln Laboratory Journal, vol. 6, No. 1, 1993.

International Preliminary Examination Report for PCT No./ US95/12817, which is related to the present Application.

Neural Networks for Computing, Snowbird, Apr. 13–16, 1986, No. 1986, 1986 Denker J.S., pp. 129–134, XP 000040996, Divko R et al 'Stochastic Spin Models for Pattern Recognition', see p. 132, paragraph 3—p. 134, paragraph 2.

Pattern Recognition, vol. 25, No. 2, 1 Feb. 1992; pp. 197–209, XP 000263525; Shiaw–Shian Yu et al, 'Relaxation by the Hopfield Neural Network'.

METHOD OF AND APPARATUS FOR SEGMENTING FOREGROUND AND BACKGROUND INFORMATION FOR OPTICAL CHARACTER RECOGNITION OF LABELS EMPLOYING SINGLE LAYER RECURRENT NEURAL NETWORK

CROSS REFERENCE TO RELATED APPLICATION

This is a continuation-in-part of application Ser. No. 08/318,352 filed Oct. 5, 1994, now abandoned.

TECHNICAL FIELD

The present invention relates to optical character recognition systems particularly usable for automated reading of address labels, and more particularly is a method of and apparatus for segmenting foreground and background information on labels having varying background and foreground densities in different sections. The method and apparatus of the present invention employs a single layer recurrent neural network.

BACKGROUND OF THE INVENTION

The motivation for the present invention arose in the field of automated address label reading. More specifically, address labels on packages employ a wide variety of colors, design and contrast between the background area and the foreground information, the foreground information constituting the printing to be read.

Experience teaches us that it is a relatively trivial problem for human beings viewing a typical label to determine what is the foreground and what is the background when the foreground information constitutes printing in a familiar character set. However, it is a very difficult problem to teach a machine to segment foreground and background information in the general case of an image that has sections of differing background densities with differing foreground densities and different contrasts between the foreground and background in various sections.

The need for the present invention arises in a system for automating the reading of shipping labels in sophisticated high volume package handling systems. The need, in particular, is to be able to use optical character recognition algorithms to recognize characters on shipping labels so that they may be input into data processing systems for routing, sorting, and tracking the packages bearing the labels. Optical character recognition algorithms are, in themselves, difficult to design and write so as to minimize the number of misread or unreadable characters. This is true even under relatively ideal conditions of high contrast uniform foreground and background densities. The problem addressed by the present invention is that of converting a generalized multiple density background label into a binary label in which the foreground and background are segmented into white and black (or black and white) areas in a binary pixel map. The available input is a pixel oriented grey scale scan of the real shipping label. The problem is to convert these observed grey scale pixel values into a set of label values for a corresponding set of label sites (i.e., corresponding to the number of pixels in the original grey scale scanned image) where the foreground is driven to one binary value and the background is driven to a second binary value.

Prior art approaches to the problem of converting a general grey scale image to a binary label image for inputting to a optical character recognition have been essentially ad hoc methods that attempt to establish thresholds between the foreground and background portions of the grey scale image. Some have employed global thresholding in which the entire observed grey scale scan of the shipping label is analyzed, and a threshold between the foreground and background is established. The threshold may be difficult to determine, and such systems often do not function properly when presented with shipping labels having portions with significantly differing background intensities.

In order to address this, some local adaptive thresholding systems have been developed. These use empirical approaches that work well with certain types of labels. However, local adaptive thresholding systems that are generally effective in processing a grey scale multiple background density shipping label to a binary label have not been found in the prior art. Furthermore, known local adaptive thresholding algorithms tend to have results that are extremely dependent on the choice of the window size in which the local thresholding is performed. Varying the window size affects the types of labels (i.e., the characteristics of the contrasting sections) for which the thresholding system will provide the correct results.

Some prior art systems have employed what is referred to as an explicit line process. An explicit line process is one that attempts to determine the boundary between adjacent regions of the label with different background intensities and to apply thresholding to each separate region in order to extract foreground information from background information in the different regions. However, the use of an explicit line process complicates the hardware implementation of the neural network. The elimination of a separate line process field gives the neural network a greater likelihood of being realizable in a very large scale integrated circuit (VLSI).

Thus, the problem to be solved by the present invention is one of generally segmenting foreground and background information into a binary representation of a shipping label. A plurality of label sites have a one-to-one correspondence with pixel locations in an original grey scale scanned representation of the shipping label. The label sites are driven to either binary 0 or 1 by the method or apparatus of the present invention in order to product a binary pixel representation of a shipping label that can then be input to an optical character recognition device for further processing. The present invention makes use of a general methodology known as the Ising spin model. This model was developed in the 1920s for magnetic materials and was later found to give useful descriptions of optimization networks. It is essentially a model of the behavior of a two dimensional array of magnetic dipoles in a slab of magnetic material. As the temperature of the material is lowered, the dipoles tend to reorient themselves less often until absolute zero is reached, at which the time the dipoles will obtain a fixed orientation. This model is applied to the general problem of calculating the probability of a pixel site label, i.e., a binary value assigned to an output pixel representing a label site for an image of a shipping label.

To calculate the probability of a pixel site label, two sources of information are available, the probability of the observed data conditioned upon the current label and a priori probability of the current labels. In this specification, the variable x refers to a vector of labels or label sites and the variable y indicates a vector of observed pixel intensities, i.e., the observed grey scale values for each pixel in the original scanned image. This terminology is used throughout this specification. In other words, the x variable used herein refers to label sites, which may be thought of as pixels within a numerical representation of the label. In this statement, "the label" or the "label sites" refer to binary values that are the output of the process and apparatus described herein, i.e., a black or white portion of an image. The y variable refers to the grayscale value of the original image, i.e., the observed pixel intensities on the physical shipping label as measured by a physical device, for example a CCD camera. Thus, the x values are the points in the ultimate output, i.e., a set of binary values for the label sites, and the y values are the original observed values of the physical image. The posterior distribution of the label vector, i.e., the probability that is obtained after combining the information due to a measurement and the information due to prior knowledge, may be expressed from Bayes law.

$$P(x|y) = \frac{P(y|x)P(x)}{P(y)}$$

where P(x|y) is the probability of a label site having a particular value given the observed grey scale value for the corresponding pixel in the scanned image.

In creating the present invention, a simplification for the probability calculation was made based on the commonly used assumption in image processing that both the observed image and the labels may be modeled by a two dimensional non-causal Markov random field. The Markov model makes the assumption that pixel site probabilities are dependent only upon a local neighborhood of pixel sites and not the entire image. Employing the Hammersley-Clifford theorem, known to those skilled in the art, it is known that a two dimensional Markov random field for label sites X and observed intensities Y may be specified by a Boltzmann-Gibbs distribution given by the expression:

$$P(x|y) = \frac{\exp - \frac{E(x,y)}{T}}{Z}$$

E in this equation is referred to as the "energy function" and is a positive definite function of system states. It is in the energy function that a succinct specification of labeling constraints may be specified, and is specified in connection with the present invention. In contrast to prior art relaxation labeling algorithms, labeling probabilities are not propagated between label sites. The probability of the labeling is implied by the energy function. In this expression, T refers to the annealing temperature, which is the temperature variable in the above referenced Ising spin model. The variable Z is a partition function and is a normalizing factor in the Boltzmann-Gibbs distribution. It turns out that partition function Z need not be calculated since minimization of the energy function corresponds to maximizing the probability for the Boltzmann-Gibbs distribution. Thus, only the energy function need be analyzed.

Taking the limit of the energy function as T goes to zero generates a mathematical description for a network that is referred to as a Hopfield type network. A known characteristic of such networks is that certain sets of the label sites in the process of convergence may get stuck at local minima rather than complete convergence to the final probability at which the energy function is actually minimized. Employing mean field annealing for which the label sites are updated over a monotonically decreasing range of temperatures has been found to be less likely to get stuck at local minima, and to converge to the probabilities for the actual minimum of the energy function. Referring back to the Ising spin model, this may be thought of as sequentially observing the average states of the magnetic dipoles as the temperature is monotonically lowered toward absolute zero at which time the final orientations of the dipoles correspond to the final values for the pixel label sites.

Some image processing work performed by Kienker et al., described in publications in 1986 employing energy minimization network from boundary inputs in a "spotlight of attention" in order to find figures on the ground in scanned images from aerial photography. While this work employs the general methodology of the present invention by using a network that minimizes an energy function while growing a figure in a label site array, the boundary input and spotlight of attention information is used in the Kienker et al. network is inadequate to address the problem of foreground/background segmentation for shipping labels. Therefore, while the basic model for representing the two dimensional probability P(x,y) of the Boltzmann-Gibbs distribution is known, and has been employed to provide realizable networks in other image processing problems, the problem presented by the foreground/background segmentation of shipping labels is the creation of an appropriate energy function that translates to a realizable network and solves the problem of foreground and background segmentation for a generalized real world shipping label. This has been accomplished by the inventor of the present invention. The energy function employed, the resulting method of segmentation, and a resulting circuit for realizing a network are described herein.

SUMMARY OF THE INVENTION

Generally stated, the present invention is a method or apparatus that transforms a grey scale pixel representation of a shipping label into a binary pixel representation of a shipping label that segments foreground information from background information over regions having varying background densities and varying foreground/background contrasts. Both the method and the apparatus minimize an energy function, which energy function is, per se, new to the present invention. The energy function employed in the present invention leads to a network in which both consistent and contradictory constraints are applied so that neurons in the network exhibit cooperative and competitive behavior during the process of converging to a final set of binary values for the label sites. For example, competing constraints of smoothing the image and detail preservation are both represented in the energy function.

Among the novel aspects of the energy function upon which the method and apparatus of the present invention are based is the use of a discrete set of scaling factors, denoted as sf(n, m), that are determined and stored for each label site from analysis of the local density in neighborhoods of the original grey scale scanned representation of the label. These, together with analysis of the gradient of image density along multiple axes are employed to handle transitions across boundaries of different background densities without the use of an explicit line process.

As with a typical recurrent network based on a Markov random field specified by Boltzmann-Gibbs distribution, the label sites are iteratively updated by analyzing the difference in the energy states for each label site as the temperature variable is lowered between successive updates. The energy function includes a term that is a function of the original grey scale value scaled by the scaling factor for the particular label site. Additionally, a novel aspect of the present invention is the employment of non-linear feedback, i.e., differing gain for each term from an adjacent label site depending on whether the current state of the label site is more toward white or more toward black and whether the original image was closer to black than white. The preferred form of the present invention biases the output toward black, but a change of relative magnitudes of the gain employed for the black case and the gain employed for the white case would lead to a bias toward white. Since this feedback factor is based on the current label site, it is also a time varying feedback, which is believed novel in a machine based on the Boltzmann-Gibbs distribution.

Furthermore, the inventor believes that present invention is unusual, and possibly unique, in its employment of different levels of resolution between the input image and the output image. Prior networks have normally been binary to binary or grayscale to grayscale processing machines. The present invention is designed for gray scale to binary processing.

An important novel aspect of the present invention is the replacement of line processes by directional derivative inputs. These are discussed at greater detail herein below in connection with the energy function employed in the preferred embodiment. Another novel aspect is the use of a shunt inhibitor term to vary the contribution of a gradient term of the energy function. In the preferred embodiment, the gradient term is a vector combination of density gradients calculated along vertical, horizontal, and ±45 degree axes. This term represents the rate at which density is changing in the input neighborhood about the label site that is being updated by a given neuron. The contributions of the gradient term is multiplied by what the inventor refers to as a shunting inhibition. The shunting inhibition is a way of inhibiting the image gradient information from making a contribution to the change of energy at locations along boundaries between regions of differing background intensities. Since the gradient in the direction of at least one of the gradient axes will tend to be very large as it crosses a boundary between starkly contrasting background densities, it is desired that this not appear as a foreground feature in the ultimate output. Thus, the shunting inhibition is employed that scales the contribution of the gradient term and will suppress it effectively. In other words, it shunts the impact of the large gradient that exists between regions of contrasting backgrounds.

The shunting inhibition of the preferred embodiment is essentially an average of the scaling factors in a 9×9 neighborhood about the label site being updated, with the scaling factor for the particular label site that is being updated being excluded from the calculation. It is noted that the shunting inhibition does not appear in an analytical form of the energy function. It has been found by the inventor of the present invention that in spite of this, the convergence of a neural network embodying the present invention does not appear to be affected.

The term "neighborhood" is used in this specification in its mathematical sense. Any given neighborhood of a particular pixel is defined as pixels within a given distance, either along rows or columns from the pixel under consideration. The same is true for label sites since each label site has the same geometric significance as a pixel in the original image. Thus, a 9×9 neighborhood of a particular pixel defines an area nine pixels wide and nine pixels high with the particular pixel being centered in the middle.

The method of the present invention includes the steps of scanning a label with a scanning device to provide a plurality of grey scale values for a plurality of pixels. This includes a competitive learning network to determine the scale factor image, an estimate of local background intensity quantified into six levels in the preferred embodiment.

A memory is established for a plurality of output label sites where the number of label sites corresponds on a one-to-one basis with the number of pixels in the original grey scale scanned image. A recurrent neural network having at least one neuron is provided where the neurons include inputs from label sites in a predetermined input neighborhood. The output of each neuron includes a contribution that has a gain that varies in response to the current state of the label sites in the input neighborhood. In the preferred embodiment, a first predetermined gain is selected if the current value of the label site in the input neighborhood is closer to black than white, and a second predetermined gain is provided if the opposite case prevails.

Adjacent label sites in a predetermined output neighborhood are sequentially updated according to a predetermined pattern and this process is repeated as the gain of an amplifier connected to a summing junction for each neuron is increased as an inverse function of decreasing annealing temperature. It is possible to construct embodiments of the present invention for which a fixed gain is employed that corresponds to an absolute zero temperature, i.e., a Hopfield network. However, it is preferred to use a monotonically decreasing annealing temperature.

Preferred forms of the present invention provide contributions from gradients about each label site that makes a contribution to each neuron and the gradient contribution is suppressed when a shunting inhibition, that is a function of average scale factors (i.e., average background densities) in a neighborhood about the label site making the contribution indicates that it is near a boundary between regions of widely varying background densities.

The method of the present invention can be practiced by a hardware implementation of the recurrent neural network, and it is particularly suited for fabrication on a very large scale integrated circuit (VLSI). It can also be implemented using a sequential general purpose digital computer or a CNAPS array working with a host computer. It believed that a two dimensional VLSI implementation of network embodying the present invention for processing a 1,000×1, 000 pixel array can be constructed that allows a throughput time of approximately 46 milliseconds per processed image. This rate is sufficient to process a large number of packages traveling on a high speed belt in a package handling facility.

The present invention implicitly updates the energy function used herein when iterating the label sites between successive values. The updating is implicit because the equations that give rise to the network are ones based on a determination of the difference in the energy between successive states. Thus, the energy function itself is not evaluated and calculated at each state, rather the change in the energy function between successive increments of time as the annealing temperature changes is what is calculated. This is the basis for the characterization of the updating of the energy function as "implicit".

Therefore, it is an object of the present invention to provide a method and apparatus that will convert a grey scale image of the label containing writing or other pictorial devices in multiple regions having varying background densities, that will segment the foreground and background information to two binary values in an output binary pixel representation of the label. This is designed so that the output image can be applied as the input to an optical character recognition system.

It is an object of the present invention to provide a recurrent single layer neural network for performing the above described foreground/background segmentation function.

It is still a further object of the present invention to provide such a neural network that will reliably converge as neuron gain is varied to correspond to a monotonically decreasing annealing temperature.

It is still a further object of the present invention to provide a recurrent single layer neural network for performing foreground/background segmentation that does not rely on explicit line processes and suppresses maintenance of information about boundaries between regions of varying background densities by selectively shunting the contribution from a gradient term in each neuron for label sites near the boundaries between regions of varying densities.

It is still a further object of the present invention to provide a recurrent single layer neural network for performing foreground/background segmentation that employs nonconstant feedback, that is a function of the most recent value of a label site and original grey scale value for the updated label site, in order to bias the output of label sites either toward white or toward black.

It is still a further object of the present invention to provide a means to estimate the local label background intensity using a competitive learning neural network, with estimates of the local label background intensity being employed as scale factors in the recurrent neural network.

It is still a further object of the present invention to provide a method of performing foreground/background segmentation in the preprocessing of a label image for an optical character recognition device that may be implemented by a recurrent single layer neural network appropriate for implementation on a very large scale integrated circuit, that can further process a high resolution representation of the label in less than 100 milliseconds.

That the present invention accomplishes these objects and overcomes the above noted drawbacks of the prior art will be appreciated from the detailed description of the preferred embodiment below.

DETAILED DESCRIPTION OF THE PREFERRED EMBODIMENT

Figure 1:
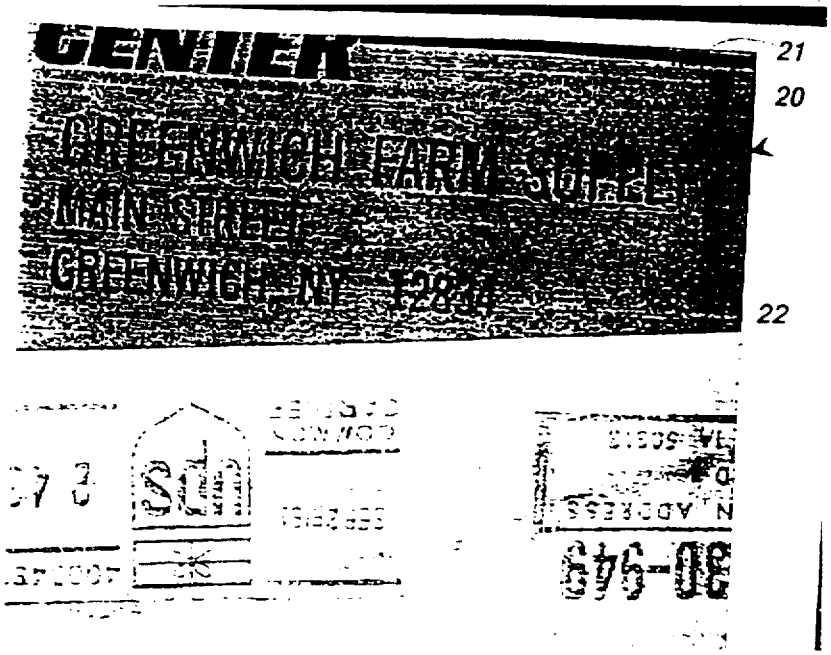
FIG. 1 is a photograph of a segment of a real shipping label over which a metered stamp from a common carrier has been applied resulting in two adjacent regions of significantly different background intensities.

Turning next to the drawing figures in which like numerals reference like parts, several embodiments, including the preferred embodiment, of the present invention will now be described.

FIG. 1 is the reproduction of a photograph of a segment of a real shipping label 20 containing an address in a high background density region 21. Part of the label has been covered by a metered payment label for a common carrier, indicated at 22. The metered label is on a white background and thus establishes a second region of much lower background density. It should be noted that FIG. 1 is a photograph of an image reproduced from a stored scanned grey scale representation of an actual label.

Figure 2:
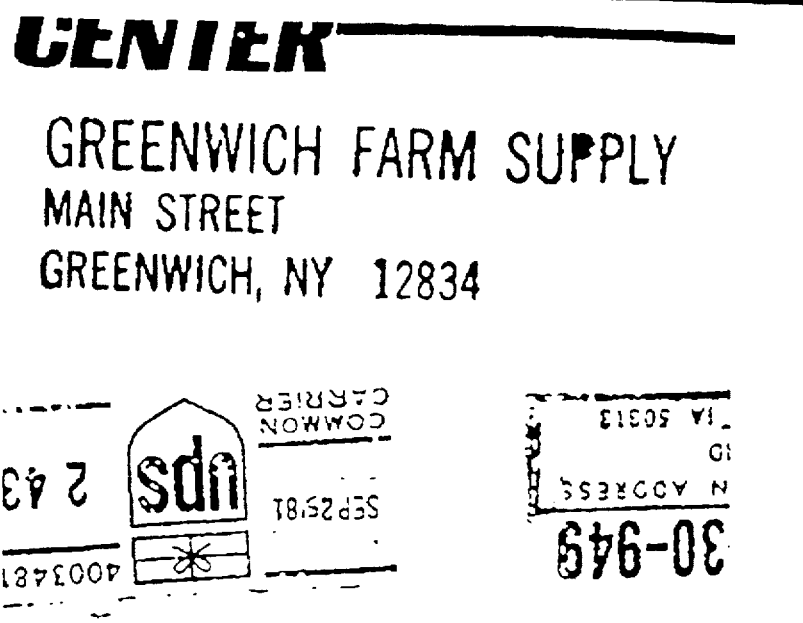
FIG. 2 is a picture of a reproduction of the binary output from the label site after having been processed by the method of the preferred embodiment of the present invention.

FIG. 2 is a photograph from a reproduced output from a binary pixel representation of the label site processed in accordance with the preferred embodiment of the present invention. FIG. 2 is a reproduction of the processed output from an actual label, i.e., that represented in FIG. 1. It should be noted that the foreground and background information have been successfully segmented into a white background and black foreground and the boundary between the areas of contrasting background densities has been eliminated.

The balance of this disclosure describes the method and apparatus that accomplishes the result of transforming a grey scale scanned image such as that shown in FIG. 1 into a binary pixel level image such as that shown in FIG. 2.

Figure 3:
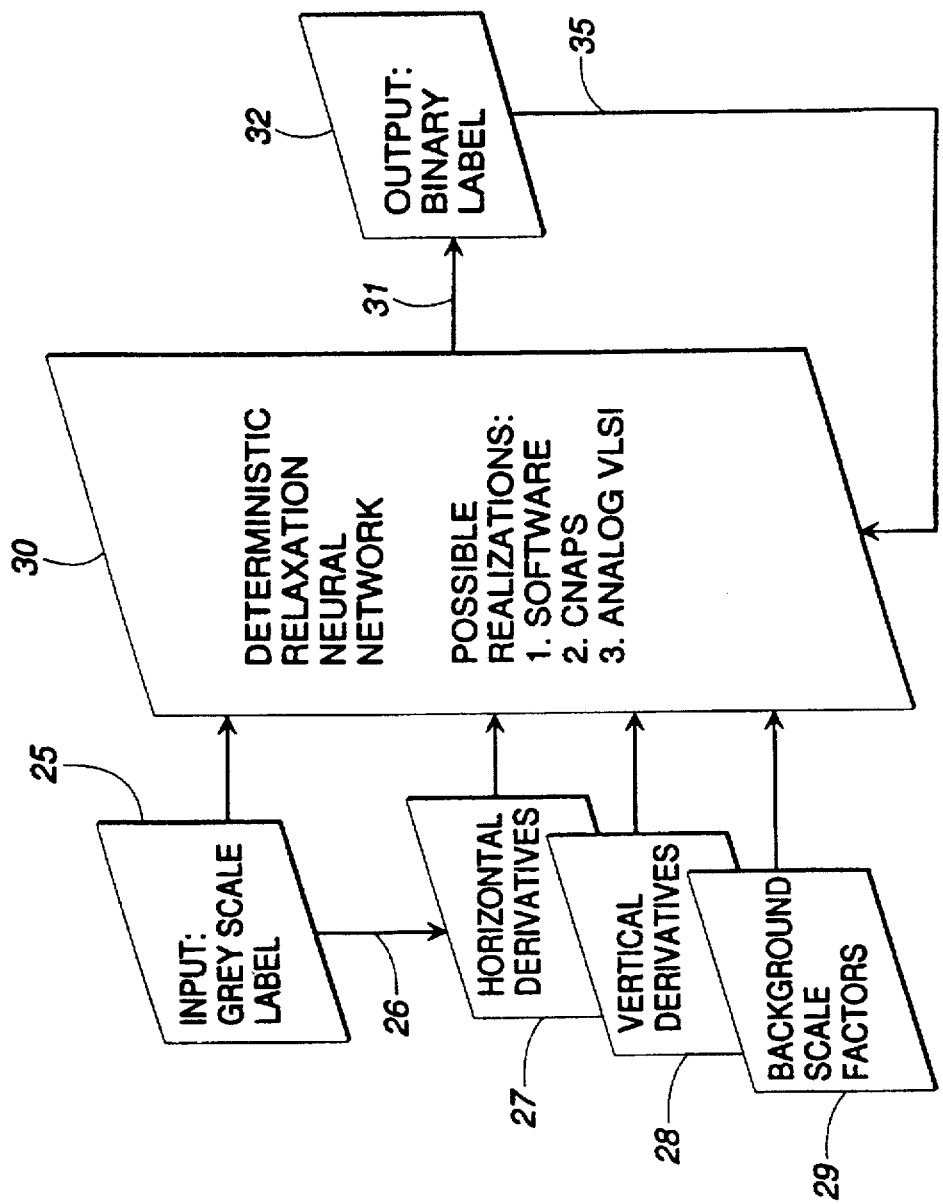
FIG. 3 is a block diagram of a network embodying the present invention.

FIG. 3 shows a high level block diagram of an embodiment of the present invention. The input to the method or apparatus of the present invention is a plurality of grey scale values indicated at 25, one value being provided for each pixel in a predetermined raster. These are provided, as indicated at 26, to devices or processes that store and calculate horizontal and vertical derivatives, indicated at 27 and 28, respectively. Additionally, the grey scale pixel values are used to calculate background scale factors, indicated at 29, that are described in greater detail hereinbelow.

Both the original grey scale pixel values 25, as well as the derived quantities 27–29, are provided as input to a deterministic relaxation neural network indicated at 30. As shown in FIG. 3, this may be implemented in a number of ways including a simulation on a general purpose digital computer, use of a CNAPS processor, and hardware circuitry that is suitable for, but not limited to, implementation in an analog very large scale integrated circuit. The outputs 31 from neural network 30 are provided to an output memory 32. It should be understood that there is at least one memory location in memory 32 for each pixel value stored in a location in memory 25. Thus, there is a one-to-one correspondence between the output label sites and the input pixels from the grey scale scan. The interim values for the label sites are provided as feedback, indicated at 35, to neural network 30 during multiple iterations of updating of the label sites in memory 32. The label sites are sequentially updated according to a predetermined pattern by network 30. This is done repetitively until convergence of the values in output memory 32 is obtained.

The inventor of the present invention believes that about 80 iterations will normally be required for convergence of mean field annealing embodiments of the present invention and about 30 would be required for Hopfield network embodiments. However, due to the superior convergence characteristics, the mean field of annealing embodiments are considered to constitute the best mode of the present invention.

FIG. 3 is a high level representation of the present invention. Next, the preferred embodiment of the apparatus of the present invention will be described. As noted hereinabove, it is believed that the apparatus described herein is particularly suitable for implementation on a very large scale integrated circuit device. However, physical embodiments of the apparatus of the present invention are not limited to such a device.

Before describing the circuitry, the theoretical basis for the novel energy function obtained by the inventor of the present invention and used in embodiments of the present invention will now be described.

In the development of the theoretical basis for the present invention, it is preferable to have the final label field sites take on values of −1 and +1 as binary values. Thus, a scale factor is needed to translate the observed image site intensities (i.e., the grey scale pixel values derived from a scanner) before providing input to a network or process of the present invention. Scaling factors may be empirically determined, and that used in the preferred embodiment is described in greater detail hereinbelow. Scale factors in the present invention generally relate to a local estimate of the average background intensity. In the notation of the present specification, the scaling factor for a given pixel site at row n column m is denoted $sf(n, m)$. It is important to note that in the preferred embodiment the scaling factors are not simply one factor by which all grayscale values are multiplied universally, but a scaling factor value is assigned for each particular pixel. In other words, the scaling employed varies from pixel to pixel.

In the preferred embodiment the scaling factors for each pixel can take on one of five discreet allowable values, although once that scaling factor is determined for that pixel, it remains unchanged during the annealing, i.e., the updating process.

As noted in the Background of the Invention section of this specification, the Boltzmann-Gibbs distribution for the two-dimensional probability is expressed in terms of the two-dimensional energy function and a temperature variable T. The design of the energy function determines how the network ultimately treats various patterns and characteristics that manifest themselves in the grayscale input image. The following describes the energy function used in the preferred embodiment and the rationale and effect of each of its terms. It should be kept in mind that one of the powerful aspects of the present invention that makes the network readily realizable, and efficient is the fact that the energy function itself must only be implicitly updated by calculation of incremental changes in the energy function, rather than calculating the values for it at two successive iterations and then taking the difference. With that in mind, the energy function employed in the preferred embodiment will now be described.

The basic energy function for the problem addressed by the present invention, i.e., conversion of input grey scale generalized label to a binary output representation of the same label may be expressed as:

$$E(x,y) = E_{intensity} + E_{label\_correlation} + \Sigma^E directional\_derivatives \quad (1)$$

The first term of the energy function is the energy conditioned upon the grey scale intensity values. It represents the cost (in terms of energy) of a label field (x) not being in agreement with the values for the observed grey scale intensities (y). Pixels of the input grey scale image that have an intensity close to the scale factor for that pixel tend to have a white label, while those with an intensity close to zero tend to have a black label. This may be intuitively understood by considering that the scale factor represents an average background intensity. This being the case, if an input point is of approximately the same value as the average background intensity, it follows that there is a good chance this point is part of the local background and should therefore be labeled as a white pixel on the output, white being the background value in the preferred embodiment. If the input image point is close to zero, it means it is a dense image and denser than the scale factor for the same pixel. It therefore is probably part of the foreground, i.e., the printing on the shipping label. The $\sigma^2$ term is the noise variance for the model. For a n×m array of pixels, the first term of the energy function of Equation (1) is given by:

$$E_{intensity} = \frac{1}{2\sigma^2} \sum_n \sum_m \left( \frac{2y_{n,m} - sf(n,m)}{sf(n,m)} - x_{n,m} \right)^2 \quad (2)$$

In this expression $\sigma^2$ is a noise variance and $sf(n,m)$ is a scale factor for pixel (n, m). As explained in greater detail herein below the scale factor is a pixel specific value related to average local intensity in the original grayscale image.

The second term of the energy function of Equation (1), the a priori energy, is a smoothing function that encourages variations in the label field to be smoothed out as one proceeds from pixel to pixel, i.e. label site to label site. In observed real world shipping labels, more often than not neighboring pixel sites have identical label values. Therefore neighboring pixels tend to be correlated. The label correlation term (the second term) of the energy function of Equation (1) is given by:

$$E_{label\_correlation} = -\sum_n \sum_m x_{n,m} \sum_i \sum_j \beta_{i,j} x_{i,j} \quad \begin{array}{l} i,j \in \eta(n,m) \\ i,j \neq n,m \end{array} \quad (3)$$

where the conditional notation indicates that subscripts i and j are indices for pixels in a predetermined neighborhood $\eta$ around pixel (n,m) but excludes the center pixel of the neighborhood, i.e., pixel (n,m). In this equation, the subscripted $\beta$ is indicated as an indexed variable. This expresses one of the novel features of the present invention, i.e., the employment of a variable coefficient in the label correlation term of the energy function depending on the current value of the label site ($x_{i,j}$) by providing a greater weight for label sites that are labeled black than white, the label correlation term of the energy function tends to be biased toward black. Therefore, the neural network may then perform region growing for black areas during multiple iterations of the label site updating process. In the preferred embodiment the correlation weight for black is indicated as $\beta_b$ and is used when the present value of the label site is −1. Similarly, a smaller value $\beta_w$ is used when the present value of the label site is 1. Additionally, the first $\beta$ value determined by the most recent value for the label site is added to a second selected $\beta$ value that is determined by the original grey scale value for the label site being updated. In the preferred embodiment the neighborhood $\eta(n,m)$ is a 5×5 region symmetrically surrounding pixel (n,m) but that excludes that particular pixel.

It is well known that some additional information about the regions needs to be provided to establish a limit to the function of label smoothing. Prior art networks have tended to include a separate binary output field known as a line process. This is used to identify and establish boundaries between adjacent regions of contrasting characteristics by establishing a high energy penalty for smoothing over the boundary between the two regions. The present invention employs no line process. Instead scaled directional derivatives taken from the original grey scale label image are used to inhibit the smoothing across region boundaries.

Naturally, adjacent label sites with high gradient values tend to be labeled differently. Thus, the gradient term needs to help drive the output of such label sites toward appropriate final values, i.e., black for foreground and white for background. However, the tendency of the gradient terms to drive such adjacent pixels to different values needs to be suppressed when the adjacent pixels have widely differing values when the corresponding background pixels also have a large gradient. This is addressed by shunt inhibitor for suppressing the contribution of the gradient term along boundaries between regions of different background densities.

In the preferred embodiment, gradients along the vertical, horizontal, +45 degree and −45 degree directions are employed. These have been found to provide sufficient gradient contributions to allow segmentation of foreground and background, and output convergence, irrespective of the orientation of the shipping label at the time it was scanned. The energy terms for the $$E_{horizontal} = \sum_n \sum_m \left( x_{n+1,m} - x_{n-1,m} - \gamma \frac{\vec{u}_h \cdot \nabla y_{n,m}}{g_{n,m}} \right)^2$$

$$E_{vertical} = \sum_n \sum_m \left( x_{n,m+1} - x_{n,m-1} - \gamma \frac{\vec{u}_v \cdot \nabla y_{n,m}}{g_{n,m}} \right)^2$$

$$E_{+45} = \sum_n \sum_m \left( x_{n+1,m+1} - x_{n-1,m-1} - \gamma \frac{\vec{u}_{+45} \cdot \nabla y_{n,m}}{g_{n,m}} \right)^2$$

$$E_{-45} = \sum_n \sum_m \left( x_{n-1,m+1} - x_{n+1,m-1} - \gamma \frac{\vec{u}_{-45} \cdot \nabla y_{n,m}}{g_{n,m}} \right)^2$$

Thus, the sum of the foregoing terms constitutes the third term of the energy function of Equation (1). The x terms are simply the label sites at the particular locations designated by the subscripts in these expressions. Gamma is a constant that is empirically chosen that controls the effect of derivative terms of the energy function. Ten is a typical value used in the preferred embodiment. The gradient vectors ($\nabla$yn, m) are the partial derivatives of the grayscale value y taken along rows and columns. They are, the preferred embodiment, preferably estimated using a finite impulse response filter having the following form $$\frac{\partial y}{\partial n}(n,m) \equiv \left( \sum_{i=1}^{N} (x(n+i) - x(n-i))h_i \right) / \left( \sum_{i=1}^{N} h_i \right)\bigg|_{m\text{ fixed}}$$

$$h_i = \frac{i}{N_f} \exp\left( \frac{N_f^2 - i^2}{2\sigma_f^2} \right)$$

$N_f$ is the number of filter samples and $\sigma_f$ is a factor chosen to desensitized the filter to noise, in a conventional fashion. The column filters response for calculating the partial derivative along a column is in the same form as that stated above except that the n and m subscripts are interchanged.

While this is a preferred way of calculating estimates for the gradients, any methodology for acquiring values for gradient vectors may be used in embodiments of the present invention.

The four unit vectors u used in this formula are the straight forward unit vectors suggested by the subscripts given by the following:

$$\vec{u}_h = \begin{bmatrix} 1 \\ 0 \end{bmatrix}$$

$$\vec{u}_v = \begin{bmatrix} 0 \\ 1 \end{bmatrix}$$

$$\vec{u}_{+45} = \begin{bmatrix} 1/\sqrt{2} \\ 1/\sqrt{2} \end{bmatrix}$$

$$\vec{u}_{-45} = \begin{bmatrix} -1/\sqrt{2} \\ 1/\sqrt{2} \end{bmatrix}$$

The normalizing factor g used with the directional derivatives is in one to one correspondence with the scale factors introduced above. For each scale factor plane, a set of points of the scale factor image with identical values (explained in greater detail herein below) the directional derivatives are normalized by the average gradient magnitude according to the following:

$$g(n,m) = \frac{1}{N_k} \sum_i \sum_j \|\nabla y_{i,j}\| \qquad sf_k = sf(i,j) = sf(n,m)$$

Rather than calculate the value of the energy function at each successive value for the annealing temperature, the inventor of the present invention has derived an expression for the change in the energy function between successive samples, and used this as the basis for construction of the physical neural network of the preferred embodiment which implements the process of the present invention.

The change in energy for any iteration of the state of the system (i.e., a change between two successive values of the annealing temperature) is simply the energy of the new state minus the energy of the old state. Similarly, the change in the value for a particular label site is simply the difference between the new value and the old value. Expanding the energy function and substituting an expression for the change of state leads to the basic expression for change in the energy function employed in the preferred embodiment.

$$\Delta E = -\left[ \frac{y_{n,m}}{\sigma^2 sf(n,m)} + \sum_{\substack{i \ j \\ (i,j \neq n,m)}} (\beta_{i,j} + \beta_{n,m})x_{i,j} + \text{Sum}_x(n,m) + \gamma \text{Dif}_y(n,m) \right] \Delta x_{n,m} \quad (2)$$

wherein the following terms have the following definitions expressed in the same notation introduced above with respect to the energy function.

$$\text{Sum}_x(n,m) = x_{n-2,m} + x_{n+2,m} +$$
$$x_{n,m-2} + x_{n,m+2} +$$
$$x_{n-2,m-2} + x_{n+2,m+2} +$$
$$x_{n+2,m-2} + x_{n-2,m+2}$$

-continued $$\text{Dif}_y(n,m) = \frac{u_h \cdot \nabla y_{n-1,m}}{g_{n-1,m}} - \frac{u_h \cdot \nabla y_{n+1,m}}{g_{n+1,m}} +$$

$$\frac{u_v \cdot \nabla y_{n,m-1}}{g_{n,m-1}} - \frac{u_v \cdot \nabla y_{n,m+1}}{g_{n,m+1}} +$$

$$\frac{u_{+45} \cdot \nabla y_{n-1,m-1}}{g_{n-1,m-1}} - \frac{u_{+45} \cdot \nabla y_{n+1,m+1}}{g_{n+1,m+1}} +$$

$$\frac{u_{-45} \cdot \nabla y_{n+1,m-1}}{g_{n+1,m-1}} - \frac{u_{-45} \cdot \nabla y_{n-1,m+1}}{g_{n-1,m+1}}$$

Next, consider the following expression:

$$h_{n,m} = \frac{y_{n,m}}{\sigma^2 sf(n,m)} + \sum_{\substack{i \ j \\ (i,j \neq n,m)}} (\beta_{i,j} + \beta_{n,m})x_{i,j} + \text{Sum}_x(n,m) + \gamma f(\Delta sf(n,m)) \text{Dif}_y(n,m) \tag{5}$$

It should be noted that the value $h_{n,m}$ is almost identical to the portion of the change of energy equation immediately above that lies within the brackets. Only the term $f(\delta s_f(n,m))$ is missing from the change of energy equation. This term is the shunt inhibitor for suppressing maintenance of information about the borders between regions of differing background intensities. The shunt inhibitor is an effective way of inhibiting image gradient information at the boundaries between differing background intensities. Instead of subtracting a quantity from a neurons activation, the shunt inhibitor multiples the activation by a number less than one. In the preferred embodiment it takes the form:

$$f(\Delta sf(n,m)) = \frac{1}{1 + b_{ss} \Delta sf^2(n,m)} \tag{6}$$

$$\Delta sf(n,m) = sf(n,m) - \frac{1}{80} \sum_i \sum_j sf(i,j) \quad \begin{array}{l} i,j \in 9 \times 9\text{neighborhood} \\ i,j \neq n,m \end{array}$$

It may thus be seen that it is a function having values between one and zero that changes in accordance with the square of the average of the scale factors for a 9×9 neighborhood about the label site being updated. The inventor of the present invention has discovered that the inclusion of the shunt inhibition is an important factor in allowing all background intensities to converge to white while maintaining information in the foreground and does not adversely impact convergence of the neural network, even though it is an additional constraint that is not derived from the energy function. In the expression for the shunt inhibitor, the variable $b_{ss}$ is a weighting that should be a positive number. It controls the weight given to the shunt inhibition in the neuron activation of equation 5, and may be varied empirically. In the preferred forms of the present invention a value of 0.01 has been employed to good effect.

The Activation function of equation 5 may be constructed into a two dimensional neural network array in either of two ways, as a hopfield neural network using binary state values or as a mean field annealing boltzmann machine.

For the hopfield neural network approach, each cell of the two dimensional array uses the following rule to update label states:

$$x_{n,m} = \begin{cases} 1, h_{n,m} > 0 \\ -1, h_{n,m} < 0 \\ x_{n,m}, \text{otherwise} \end{cases}$$

On the other hand, for the mean field annealing boltzmann machine each cell of the two dimensional array implements the following differential equation:

$$\frac{d}{dt} \bar{x}_{n,m}(t) = -\bar{x}_{n,m}(t) + \tanh\left(\frac{h_{n,m}(t)}{2T}\right)$$

Here it is understood that the actual label state values are replaced by their average values, $\bar{x}_{n,m}$, for each cell of the two dimensional array. Further, as a consequence of being an average of the true state values, the state values for the mean field annealing boltzmann machine take on a continuous range of values. It is a consequence of the convergence properties of the energy function that this continuum of values will eventually settle to the desired discrete values.

As noted hereinabove, the mean field annealing embodiment of both method and apparatus of the present invention is considered by the inventor to be the best mode. This requires that the value for the temperature variable be monotonically lowered. The inventor has discovered that the rate of label field changes that are experienced in embodiments of the present invention tends to change in proportion to the logorithm of the temperature variable. There is a critical temperature about which most state changes occur. Therefore, it is preferable to employ an annealing schedule with a relatively large number of iterations about the critical temperature and a smaller number of more widely spaced variations between iterations at temperatures much greater or less than the critical temperature. The inventor has determined empirically that the following annealing schedule gives good results in embodiments of the present invention. The value for temperatures should initially be set to 1,000 and should be incremented by dividing by 1.1 unless the temperature falls within a range between 10 and 500, in which case it should be incremented by dividing by 1.5.

Equation 5 above is the neuron activation function. As noted hereinabove, it essentially represents the bracketed portion of the change of energy function with the addition of the shunt inhibition being multiplied by the gradient term. First, the portions of the neuron activation function that take fed back present values for label sites as inputs are used to create a network activation element. This is reproduced multiple times within a given neuron, the number of times it is replicated being a function of the input neighborhood size employed. Thus, the realization of a physical network for this portion of the network activation function will now be described in connection with FIG. 4.

Figure 4:
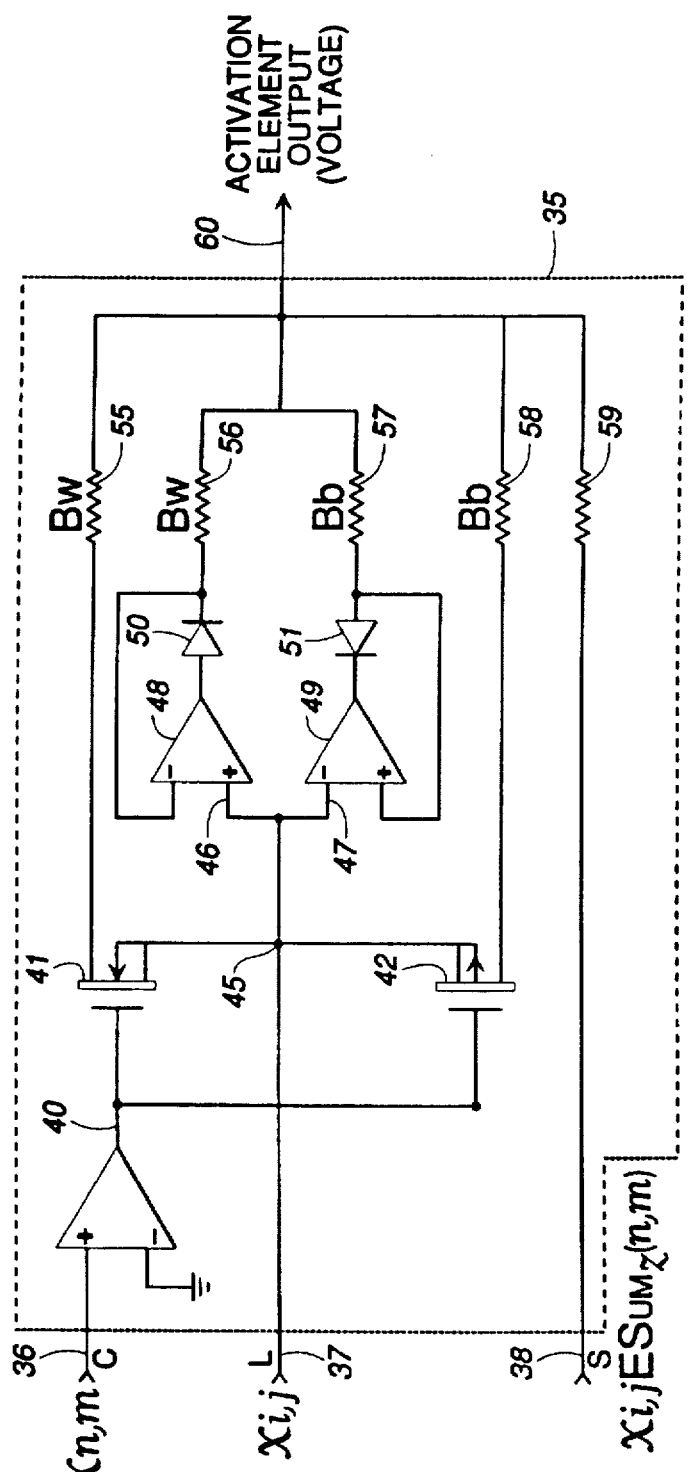
FIG. 4 is a schematic diagram of a neuron activation element used in neurons in the preferred embodiment of the apparatus of the present invention.
Figure 5:
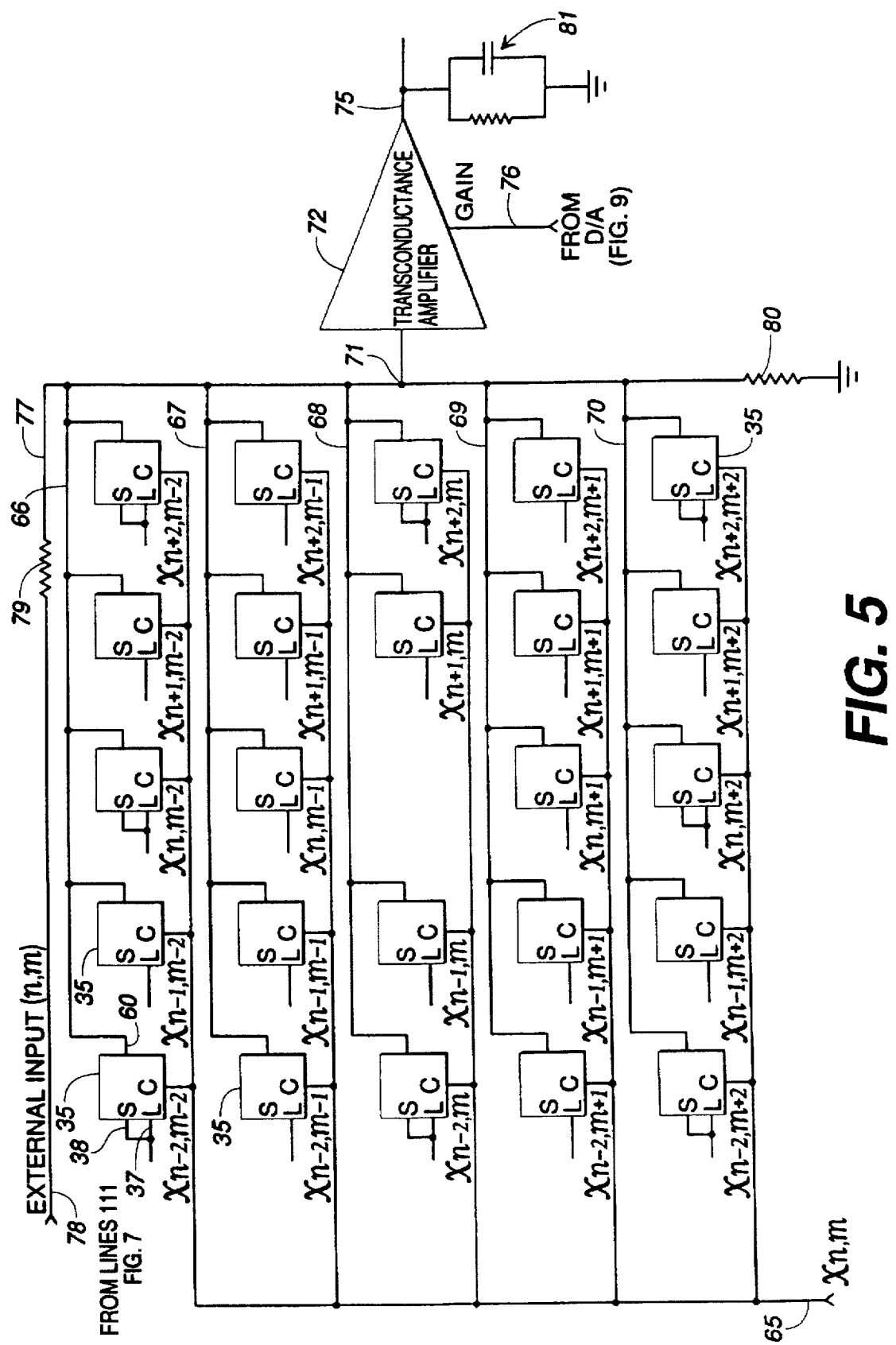
FIG. 5 is a block diagram of a neuron of the preferred embodiment.

FIG. 4 shows one slice of a neuron activation element surrounded by dashed line 35 that is used in the preferred embodiment of the apparatus of the present invention. Neuron activation slices are combined into a two dimensional array, with one neuron activation slice for each feedback connection, to form the complete neuron activation element. FIG. 5 shows 24 neuron activation slices arranged on a two dimensional grid to connect 24 feedback inputs, as is employed in the preferred embodiment. The first input to activation element 35 is provided on line 36, labeled input C. This is the most recent value of the label site as currently being updated by the neuron to which activation element slice 35 is attached. This is indicated in nomenclature of this specification as label site $x_{n,m}$. The other label sites are indicated as having subscripts i,j. These are particular members of the input neighborhood employed in the preferred embodiment, there being one neuron activation element slice 35 for each member of the input neighborhood employed in an embodiment of the present invention.

The preferred embodiment of the present invention employs a 5×5 input neighborhood and excludes the center label site, i.e., the label site currently being updated by a particular neuron. Thus, there are 24 separate neuron activation element slice 35 provided for each neuron activation element.

The input for the particular label site that is a member of the input neighborhood appears on line 37 and is indicated as input $x_{i,j}$. It is labeled input L. There is a third input on line 38 for the most recent value of a label site that is a member of the expression $Sum_x$ (n,m). It is labeled input S. Referring for a moment to the definition of this term in the energy function (Equation 4 above) this input will be connected to network activation elements in the neuron (in the preferred embodiment using a 5×5 input neighborhood) which elements have label sites two rows above and two rows below the site being updated ($x_{n,m}$) that lie in the same column, the pixels spaced two columns away from the updated label site that lie on the same row, and the pixels at the corners of the input neighborhood. The other pixels in the input neighborhood make no contribution to this term of the energy function. Therefore, network activation elements connected to those pixels in a neuron should either omit the input on line 38 or not connect same.

The input from the (n,m) label site is applied to an amplifier 39 that is used to drive apparatus forming an ideal diode for selection of the correlation weight factor of $\beta_{n,m}$. The output from this amplifier appears on line 40 and drives both an N channel FET device 41 and a P channel device 42. One and only one of transistors 41 and 42 turns on in response to the polarity of the output on line 40. This has the effect of selecting either weighting resistor 55 or 58 to make a contribution to the current on output 60. The combination of transistors 41 and 42 and amplifier 39 form an excellent approximation of an ideal diode that is biased to switch very near zero point for the input on line 36. An ideal diode, as is quite well known to those skilled in the art, is a device that conducts only in one direction, depending on the polarity of the applied voltage to its terminals, has no forward loss when in the conducting state, and no reverse current when in the nonconducting state. The selection of one of resistors 55 or 58 corresponds to the selection of the term $\beta_{n,m}$ in the second term of the neuron activation function.

The respective sources of transistors 41 and 42 are connected to point 45 to which input 37 and non-inverted inputs 46 and 47 of operational amplifiers 48 and 49, respectively, are connected.

The outputs of amplifiers 48 and 49 are connected to diodes 50 and 51, respectively. This combination will cause either amplifier 48 or 49 to cause one of diodes 50 or 51, respectively, to conduct depending on the polarity of the signal on line 37. The signal at point 45 will drive one of amplifiers 48 and 49 off, and other on. Thus, one of diodes 50 or 51 will conduct under the circumstances, depending on the polarity of the input on line 37. Diodes 50 and 51 are connected to weighting resistors 56 and 57, respectively, and thus one and only one of these makes a current contribution to the output on line 60 in response to the polarity of the most recent value of the input neighborhood label site ($x_{i,j}$) to which the network activation element 35 is connected. This selects factor $\beta_{i,j}$ in the second term of the neuron activation function.

Having described the neuron activation element of the preferred embodiment, the overall structure of the preferred embodiment will be described in connection with FIGS. 5–9. In particular, the present specification builds up the description of the system from the more detailed elements from which some of the more important aspects of the present invention may be appreciated, to the overall system of the preferred embodiment shown in FIG. 9. In particular, it should be noted that FIG. 9 is a specific implementation of the generalized system illustrated in FIG. 3.

With that background, it is appropriate to start with the diagram of a typical neuron of the preferred embodiment that is illustrated in FIG. 5. As shown in FIG. 5 each neuron of the preferred embodiment includes 24 replications of the neuron activation element slice 35 that is illustrated in FIG. 4. For the sake of not cluttering the drawing, the input and output lines from the neuron activation element slices have corresponding reference numerals to those shown in FIG. 4 applied only to the upper left hand element. All of the identical blocks in FIG. 5 are duplicates of the neuron activation element shown in FIG. 4. Each block has inputs labeled S, L, and C in accordance with the labeling of the inputs shown in FIG. 4. It should be noted that there is no connection to the S input for the neuron activation element slices 35 that appear in the (m−1) th row, the (m+1) th row, the (n−1) th column, and the (n+1) th column. This is in accordance with the description of the contribution for the $Sum_x$ (n,m) term of the energy function. For the other neuron activation elements in the array, both inputs L and S are tied together and connected to the input $x_{i,j}$.

The exemplary neuron of the preferred embodiment illustrated in FIG. 5 is designed to include a 5×5 input neighborhood array (with the center matrix element missing) of 24 of the neuron activation elements as illustrated in FIG. 4. Each L input for the array bears a label that is subscripted according to the row column position of the input neighborhood relative to the particular (n,m) th pixel site currently being updated. Thus, the subscripts in terms of offsets from n and m that are shown for the inputs on FIG. 5 are relative to the center position of the array.

The C input (line 36, FIG. 4) for each neuron activation element is tied to a common input 65 that carries the current value of $x_{(n,m)}$ since all neuron activation elements for the neuron respond to this value at any given update time.

The outputs of all neuron activation elements (line 60, FIG. 4) are tied together through common lines 66–70, which are in turn tied together to a common summing node 71. The voltage node 71 provides the input to transconductance amplifier 72. As is known to those skilled in the art, a transconductance amplifier provides an output current proportional to an input voltage. Thus, the output current on line 75 from transconductance amplifier 72 is proportional to the voltage on its input node 71 as scaled by a gain determined by the gain input on line 76. As noted on FIG. 5, line 76 carries a voltage value output from digital-to-analog converter 165 (FIG. 9). This gain is proportional to the 1/T value that is varied according to the decreasing in the temperature variable T for the mean field annealing process.

Each of the outputs 60 from each neuron activation element serves as either a current source or sink by either injecting or removing current from node 71. As can be seen from inspection of FIG. 5, the voltage at summing node 71 is equal to the sum of all the current contributions from the outputs, as well as the current provided on input line 77 from external input 78 through weighting resistor 79, all algebraically summed and multiplied times the value of input resistor 80. Thus, it is the IR drop across input resistor 80 that determines the voltage value input to amplifier 72.

The external input 78 provides a contribution to the neural activation function due to both gradient terms and scaled input image terms described hereinabove. Each point of this combined image contributes either a source or a sink of current to the summing node 71. A parallel RC network 81 damps the output of the transconductance amplifier on line 75.

Figure 6:
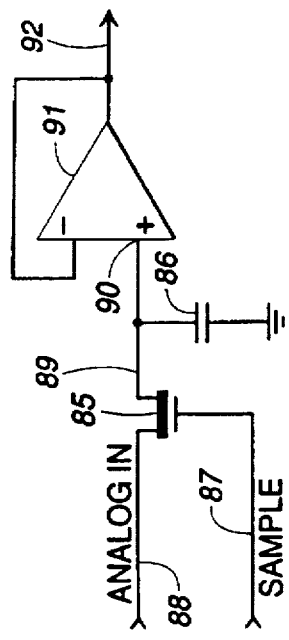
FIG. 6 is a schematic diagram of an idealized analog dynamic random access memory (ADRAM) element used in the preferred embodiment.

FIG. 6 shows an idealized element of the analog dynamic random access memory (ADRAM) used in the preferred embodiment. A metal oxide semiconductor transistor 85 serves as a switch, and capacitor 86 stores a charge proportional of the analog input voltage. The sample control line for the illustrative cell is line 87, connected to the gate of MOS transistor 85. When the signal on line 87 turns transistor 85 on, capacitor 86 is provided a charging or discharging path through analog input line 88 and the quantity of charge on the capacitor can change. When the signal on line 87 turns transistor 85 off, both the source of the MOS transistor connected to line 89 and the non-inverting input 90 of isolation amplifier 91 present a very high impedance, and thus the state of charge of capacitor 86 persists. Isolation amplifier 91 thus serves as a buffer and provides an output voltage on line 92 proportional to the voltage across capacitor 86, and thus proportional to the charge stored thereon. Practical implementations of real ADRAM circuits are known to those skilled in the art and employed in the preferred embodiment.

Figure 7:
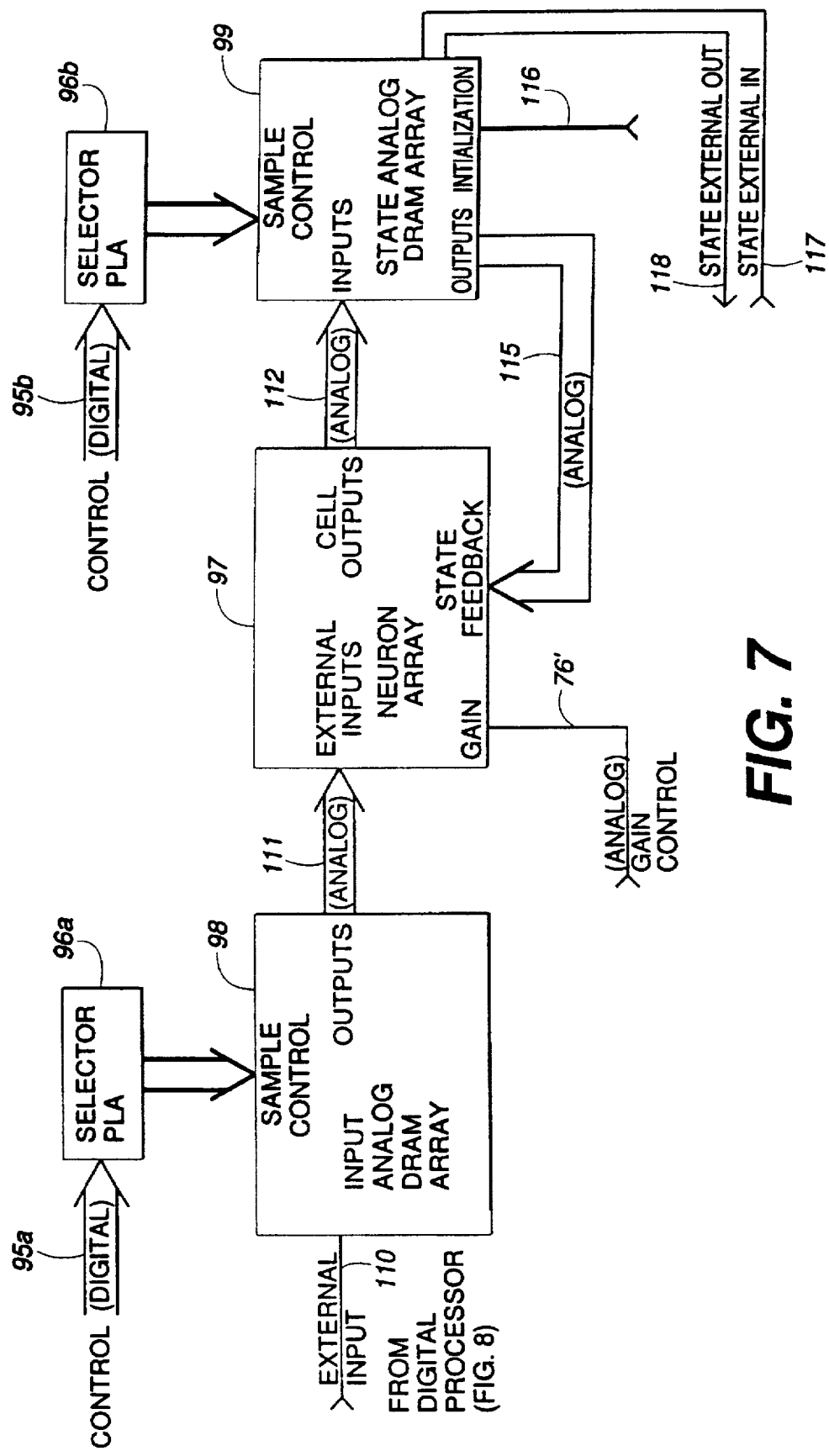
FIG. 7 is a block diagram of the analog computation block of the system of the preferred embodiment.

FIG. 7 illustrates the analog computation block used in the system of the preferred embodiment. Control inputs 95a and 95b drive selector programmable logic array devices (SPLA) 96a and 96b that control both the reading and writing of the input and state analog DRAM memories. Note that only digital lines are switched in this arrangement and the analog connections between neuron array 97 and DRAM arrays 98 and 99 remain unchanged. The input ADRAM array is indicated as array 98 and the output array is 99, which holds current values for the label sites. While the present invention could be practiced with but a single neuron in neuron array 97, the preferred embodiment incorporates redundant neurons within neuron array 97. By only selecting output memory cells that are to be modified, the effect of the input and output neighborhoods employed in the preferred embodiment may be duplicated over the non-overlapping 3×3 output neighborhoods. Thus, the entire array of pixels to be processed is preferably divided into non-overlapping 9×9 neighborhoods with one physical neuron cell corresponding to each label site. Only those physical neurons with non-overlapping 5×5 input neighborhoods are permitted to change their corresponding output label site values. The SPLA selectively steps through each group of 3×3 physical neuron cells to effectively emulate the processing of a single neuron within a 3×3 output neighborhood. This provides an advantage for a simpler VLSI implementation as well as considerably faster operation.

External input to the input ADRAM array is provided on line 110 from the digital preprocessor shown in FIG. 8 and described hereinbelow. The gain control provided to the transconductance amplifier in the neurons is provided along line 76' from a digital-to-analog converter that is connected to the host, as described in connection with FIG. 9. Outputs from the input ADRAM array are provided on multiple analog lines, commonly indicated as 111, and outputs to the ADRAM array that stores the label site values are provided on a set of analog lines indicated as 112. The state feedback used by the neurons is provided on a set of analog lines indicated as 115. An initialization of the output ADRAM array is indicated by line 116, which sets all elements in the array to an initial value. Values for the states in the state ADRAM array are input on line 117 and current values to be stored are read out of the state ADRAM array on line 118.

Considering FIG. 7 in connection with Equation 5 above, it will be readily apparent to those skilled in the art that the quantities stored in input analog DRAM array 98 are those terms that include $Y_{n,m}$, the scale factor, $sf(n,m)$, and the gradient term $Dif_y(n,m)$. The label site output values are stored in state ADRAM array 99 and the state feedback is provided along lines 115.

Figure 8:
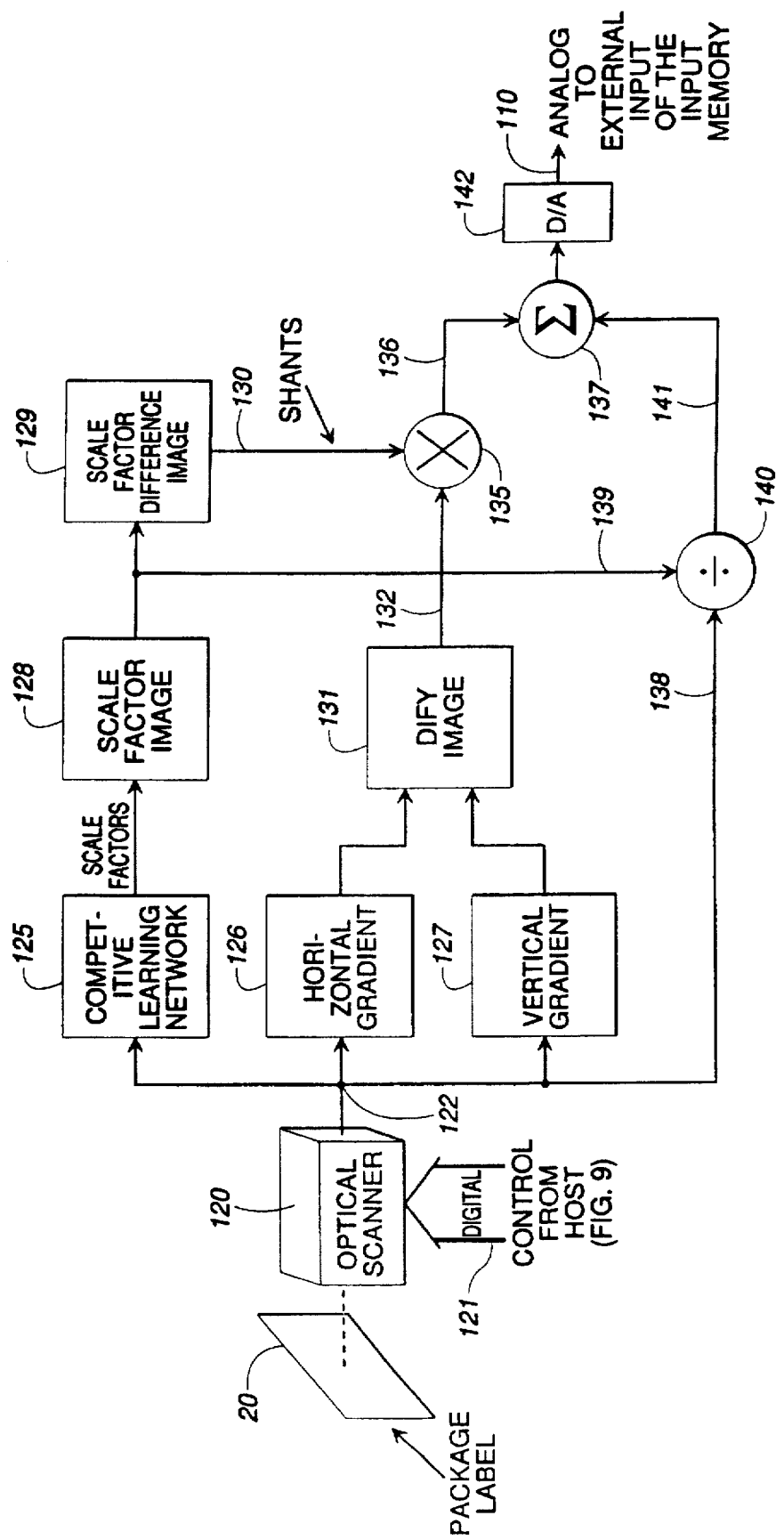
FIG. 8 is a block diagram of the image acquisition and digital preprocessing apparatus used in the system of the preferred embodiment.
Figure 9:
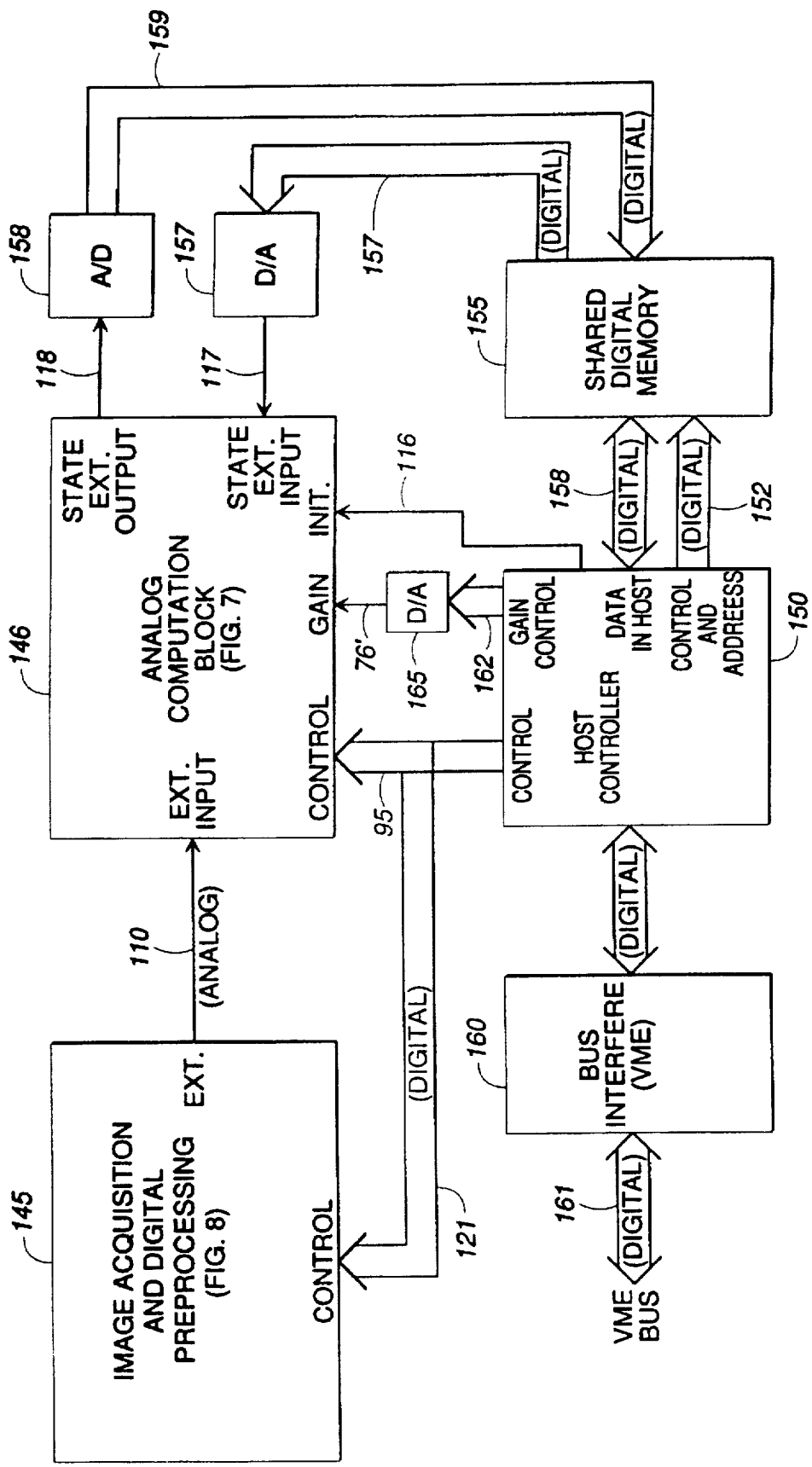
FIG. 9 is a block diagram of the system of the preferred embodiment.

Turning next to FIG. 8, the image acquisition and digital preprocessing apparatus of the preferred embodiment is shown. The exemplary package label 20 (FIG. 1) is passed before an optical scanner 120 that is controlled by the host computer (FIG. 9) through digital control lines 121. The output for each pixel appears as a grey scale representation of the pixel at point 122 where it is distributed to three computational networks: competitive learning network 125, horizontal gradient calculating network 126, and vertical gradient calculating network 127.

In the preferred embodiment, scanner 120 is a conventional grey scale scanner and is controlled to subdivide label 20 into a 1,000×1,000 array of pixels. In a strict sense, scanner 65 does not form a part of the present invention since the present invention is designed to operate on output from such a conventional scanner. However, it is shown as included in a system embodying the present invention.

Competitive learning network 125 implements the following process to establish a set of scale factor values. The number of scale factor values is determined by the variable PLANES, which is set to six in the preferred embodiment, in the description of the competitive network.

1. Initialize the output values of PLANES units, the first unit is given the value O, $Sf_i=Sf_{i-1}+255/(PLANES-1)$, and the last unit is given the value 255. In addition each unit has an associated pixel counter, $N_i$, is initialized to zero.

2. For each z value of the grey scale image { a. Pick the winning unit: select the ith unit such that
   $|z-Sf_i|<|z-Sf_j| \forall j \neq i$ b. update the winning unit:

$$s_{f_i} = \frac{1}{N_i+1}(N_i s_{f_i} + z)\ N_i = N_i + 1$$

3. For each label site (label sites are in one to one correspondence with input grey values){

Locate the ith scale factor unit that is closest to the grey value, z. In other words, pick I such that $|z-Sf_i|<|z-Sf_j| \forall j \neq i$ $Sf(n,m)=Sf_i$ After this is accomplished, the grey scale closest to the grey scale factor is calculated by a sequence of local maximum operators followed by a local minimum operator. It has been found that at 31×31 pixel local maximum and minimum neighborhood gives good results. As noted hereinabove, the value of PLANES is set to six in the preferred embodiment so that the variable PLANES takes on values 0–5. As noted hereinabove, the scale factors may be intuitively considered an indication of the local background intensity for a portion of the label. When the competitive learning network 125 has completed its operation, a finite set of scale factor values (six in the preferred embodiment) have been determined and one of these will be assigned at each pixel, i.e., label site, and will be stored in the scale factor image memory 128.

Local differences in the scale factor image are then employed to serve as the shunting terms to inhibit borders between neighboring regions of differing background intensities. The scale factor differences are calculated and the shunting factors are stored, as indicated at 129 in FIG. 8. The values stored in the memory of element 129 are provided along lines 130 as the shunt values, i.e., the term $\Delta S_f(n,m)$ in the neuron activation equation (Equation 5) indicated above.

In parallel to the scale factor processing, the gradient processing is performed. Horizontal and vertical line derivatives are estimated from the original grey scale image label by horizontal gradient calculating block 126 and vertical gradient calculating block 127. These are algebraically combined to produce the values for $Dif_y$, one value being provided for each pixel in the memory of the processing block indicated as 131. These provide the gradient terms for the neuron activation equation. The outputs of the gradient terms are provided along lines 132 as one input to multiplier 135, the other input of which carries the shunting terms from lines 130. The output of the multiplier appears on lines 136 as an input to adder 137. Multiplier 135 uses the previously computed shunting terms from lines 130 to modify the gradient terms on lines 132 to achieve the background border inhibition that is important to the present invention. Thus, the output on line 136 carries the gradient information over most regions of the label except when same is suppressed by the shunting terms on lines 130 when processing along borders between areas of significantly differing background intensities.

Also operating in parallel to these tasks is the scaling of the input grey scale image provided along lines 138. The original grey scale values on line 138 are divided by the scale factor values from the memory of processing block 128, that are provided on lines 139 as the other input to divider 140. The output of divider 140 appears on lines 141 as the other input to adder 137. These correspond to the division of the original grey scale value $Y_{n,m}$ by the scale factor for the corresponding pixel that is shown in the neuron activation equation. Upon completion of all three tasks, with any necessary delays inserted to insure that the scale factor image and shunt values are available when needed, the modified $Dif_y$ image and the scaled input grey scale image are summed together by adder 137 and the output for each pixel is provided to digital-to-analog converter 142, the output of which appears on line 110 and is provided to the input ADRAM array 98 (FIG. 7).

FIG. 8 shows separate computational processing elements 125–128 for the competitive learning network, the horizontal and vertical gradient calculations and the scale factor image calculation and storage, respectively. This is employed to emphasize the logical structure of the preferred embodiment and to intuitively relate to the significance of the terms in the neuron activation equation discussed hereinabove. As of the writing of this specification, the inventor believes that the best mode of implementing the digital preprocessor is either in a VLSI circuit, or performing all of these functions in a pipeline based digital signal processor (DSP) such as those currently manufactured by Datacube.

Other implementations of the present invention are of course possible. In particular, rather than preprocessing the scale factor and gradient information to the summation node 137 as is done in the preferred embodiment, it is possible to provide separate terms that represent the product of the scale factor difference image (i.e., the shunting inhibitions) and the gradient term for each pixel. This output can be applied to a weighting resistor at each neuron activation slice to provide a further contribution to the output at summation node 71. Similarly, in such an embodiment, another weighted contribution would be provided to the summing node from the quotient of the original grey scale value for a pixel divided by the scale factor associated with that pixel, and this value would be applied to each neuron activation element slice. The inventor believes that preprocessing the composite term to summer 137 saves real estate in a VLSI implementation of the present invention.

Having described the components of the system of the preferred embodiment from the more specific to the more general, the overall system architecture of the preferred embodiment is reached in FIG. 9. The image acquisition and digital preprocessing block 145 comprises the apparatus illustrated in FIG. 8. The analog computation block 146 comprises the apparatus shown in FIG. 7. The apparatus is controlled by a host controller 150, preferably implemented by a conventional high speed 32 bit microprocessor having a bidirectional data bus 151 and an address and control bus 152 connecting it to shared digital memory 155 that stores various parameters and intermediate values (as well as final label site values) during operation of the preferred embodiment. Output from shared memory 155 is provided along a bus 156 to a digital-to-analog converter 157 that provides output on 117 to load current label site values during updating of particular neighborhoods and different members of particular neighborhoods during operation. Since the labels sites values, which are the ultimate output of the preferred embodiment, are stored in shared digital memory 155, this memory contains the final binary output that results from performance of the process of the preferred embodiment described herein. At all times during the processing of numbers toward convergence, the label site memory locations take on either +1 or −1 binary values. The inventor has discovered that performance of the network is sensitive to the initial values of the labels sites, and it is believe preferable to select black or white pixel values for the label sites according to assignment of random numbers for initial values. A pseudo random number generator is used to provide random numbers within a predetermined range. Values within one half of the range that are selected for label sites assign those sites one of the binary values (either black or white) and values for label sites falling in the other half of the range are assigned the opposite binary value upon initialization. The external output from state ADRAM array 99 (FIG. 7) is provided along line 118 to an analog-to-digital converter 158 that provides output on bus 159 back to shared digital memory 155. Thus, the digitally processed external image is converted to analog before being passed along to the analog computation block 146. After initialization of the memory cells within analog computation block 146, several cycles of state updates take place. Upon completion of these cycles, the analog values stored in state ADRAM 99 (FIG. 7) are converted to digital values by converter 158 and down loaded into shared digital memory 155.

The host controller 150 times the cycling between input and output neighborhoods, the details of which are described hereinbelow in connection with FIG. 10. The ADRAM arrays 98 and 99 (FIG. 7) are smaller than the shared digital memory (in terms of number of pixels accommodated) in the preferred embodiment and an important task of a host controller is bidirectional transfer state labels between the state ADRAM 99 (FIG. 7) within analog computation block 146 and shared digital memory 155. Blocks of input image data need to be selectively transferred from the image acquisition and preprocessing block 145 to the input ADRAM 98 (FIG. 7). Upon completion of all state label update cycles and convergence of the network, the host controller transfers the completed binary label to a utilization device that will perform the optical character recognition (OCR) analysis. In the preferred embodiment, an interface for the VME bus is provided at 160 and the VME bus connection to the utilization device is shown at 161.

A digital output is provided on port 162 to a digital-to-analog converter 165, the output of which appears on line 76' as the gain control used by the transconductance amplifier of the neurons within analog computation block 146. As noted hereinabove, this gain varies inversely with the annealing temperature under the control of host controller 150. It will be appreciated from the foregoing that the preferred embodiment provides a single layer recurrent network that may be implemented in a VLSI circuit in a relatively straightforward manner. It is also computationally efficient and lends itself to a wide variety of implementations for which the only trade offs are complexity of the hardware versus the speed at which the overall processing of a given number of label sites can be achieved.

Turning for a moment to FIGS. 5 and 7, it should be noted that resistor 79 is connected to input line 78 and its input is derived from one of lines 111 (FIG. 7). Thus, resistor 79 is a weighting resistor for the external input derived from the image acquisition and digital preprocessing block illustrated in FIG. 8. This weighting resistor needs to reflect the constants of the noise variance $\sigma^2$ and $\gamma$. From the neuron activation equation and basic circuit theory, the selection of the value for resistor 79 will be apparent given the values of the parameters it represents.

As of the writing of this specification, the inventor has found that the following values for the parameters described herein above seem to work best. The noise variance $\sigma^2$ should be said equal to 0.1. $\beta_w$ should be set to 2.5 and $\beta_b$ should be set to 2.7. A value of 10.0 for $\gamma$ and 0.01 for $b_{ss}$ are used.

Figure 10B:
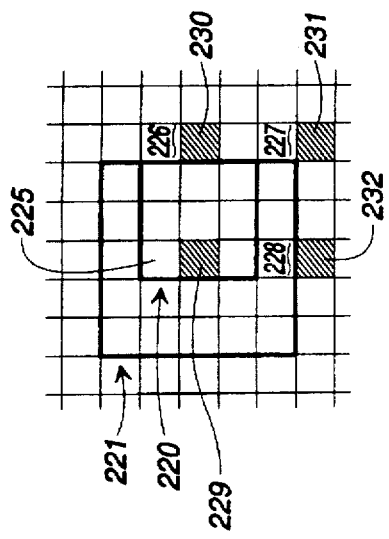
FIG. 10, which consists of FIG. 10A–10D, is a sequence of diagrams showing the relationship between input neighborhoods and output neighborhoods in the preferred embodiments of the present invention.
Figure 10A:
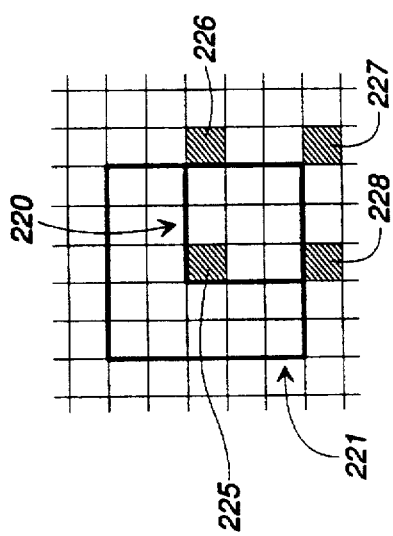

FIG. 10A–10B describe beginning portions of a label site updating schedule used in a multiple neuron embodiment of the apparatus shown in FIG. 5. In order to understand FIG. 10, basic constraints of an input neighborhood and output neighborhood, as defined in the preferred embodiment, will be described. The sufficiency of a 5×5 input neighborhood has been determined empirically. It is believed to be the best trade off between network performance and minimum complexity, but the present invention is in no way limited to embodiments employing 5×5 neighborhoods, or even square matrix neighborhoods.

For a network that employs 5×5 input neighborhoods, it is permissible for every fourth unit, going across a row or a column to be updated (i.e., to change state) simultaneously. Therefore, the selection of a 5×5 input neighborhood indicates that the selection of a mutually exclusive 3×3 output neighborhood can be used and the entire array can be updated by the nine iterations required to update all members of the 3×3 output neighborhood. Another way of looking at this is that each neuron corresponds to a 5×5 input neighborhood. Since the pixel being updated (n,m) by the neuron lies in its center, any pixel disposed three pixels away, either vertically, horizontally, or diagonally, may be updated without changing a label site that is making a contribution to the output of that particular neuron. Therefore, the entire array can be tiled into contiguous, non-overlapping 3×3 output neighborhoods. The input neighborhoods operating on pixels within the mutually exclusive output neighborhoods both overlap each other and shift (logically and geometrically) around the array in order to keep the pixel being updated at the center of the input neighborhood.

This somewhat wordy description is illustrated in principle in FIG. 10. In FIG. 10, a fixed portion of the array of label sites is indicated as a particular 3×3 output neighborhood. This is referenced by numeral 220. The input neighborhood connected to a particular neuron moves about output neighborhood 220 as successive label sites within output neighborhood 220 are updated. The input neighborhood is referenced as 221 in the subfigures of FIG. 10. However, unlike the output neighborhood, it encompasses different physical label sites at different iteration times.

FIG. 10A shows conditions when label site 225 is being updated. Label sites being updated are indicated by diagonal hatching on FIGS. 10A–10D. First, it should be noted that label site 225 is at the center (i.e., position (3,3) in the input neighborhood 221) in FIG. 10A. Label site 225 is in the upper left hand corner of the output neighborhood 220. Hatching on adjacent label sites outside input neighborhood 221 indicate that these are also being updated at the same time. These are indicated as label sites 226, 227, and 228. Each of pixels 226–228 has its own associated 5×5 input neighborhood, all of which overlap input neighborhood 221. However, since all of these lie outside input neighborhood 221, there is no danger of updating a pixel at the same time it is making a contribution to an input neighborhood for the updating of another label site. Likewise, none of the other input neighborhoods include label site 225.

The next iteration employed is shown in FIG. 10B. This steps the pixel being updated down one row so that label site 229 within output neighborhood 220 is now being updated. At the same time label site 229 is being updated, label sites 230, 231, and 232 are also being updated. Again, all of these lie outside input neighborhood 221 which is also shifted down one row to maintain the label site being updated (site 229) in the center of input neighborhood 221. From inspection of FIG. 10B, it will be apparent that the input neighborhoods operating on pixels 230–232 have made similar shifts to input neighborhood 221.

Figure 10D:
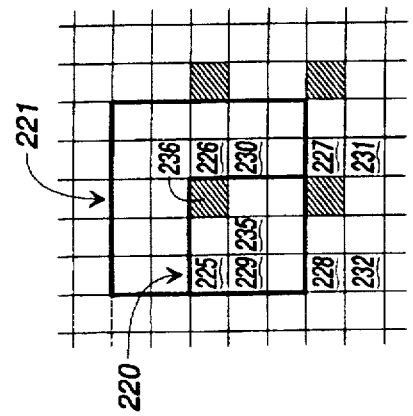
Figure 10C:
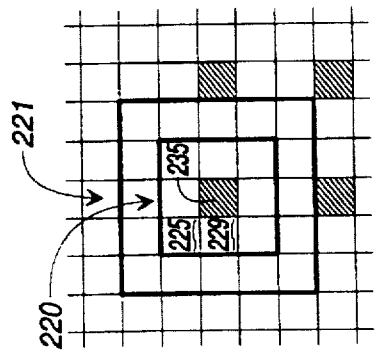

The next update moves one step to the right and operates on pixel 235 in the center of output neighborhood 220. To avoid belaboring the point, the adjacent pixels being updated (which could also include pixels to the left and above input neighborhood 221) are shown, and all outside the input neighborhood. FIG. 10D shows the relative positions of input and output neighborhoods when label site 236 is being updated.

From the foregoing it should be apparent that the 3×3 output neighborhoods remain fixed and 5×5 input neighborhoods shift around these under the control of selection controller 211 (FIG. 5). Dividing the number of pixels provided in the scan by 9 provides the number of neurons that are needed to process the grey scale image as quickly as possible.

The foregoing has been a description of the apparatus of the preferred embodiment. The operation of the preferred embodiment described hereinabove describes the preferred embodiment of the method of the present invention.

Figure 11:
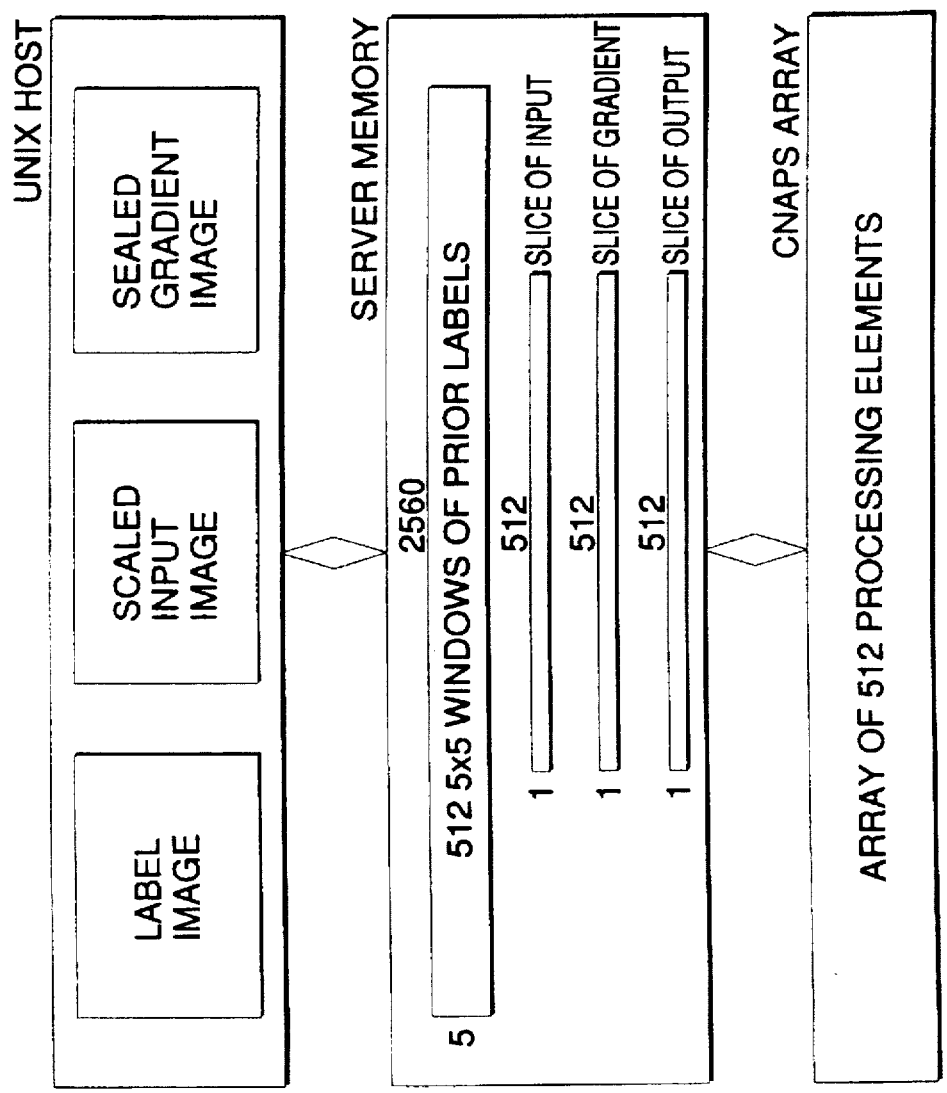
FIG. 11 is a block diagram of an alternate embodiment of the present invention implemented using CNAPS array.

The method of the present invention may also be practiced by alternate apparatus. For example, FIG. 11 shows a block diagram of an implementation employing a CNAPS array. The Adaptive Solutions CNAPS is a member of the class of machines known as serial instruction multiple data, SIMD. As such, a multiple of processing nodes, PN's, are employed to evaluate multiple label sites in parallel. Two aspects of the CNAPS distinguish it from the previously described parallel analog approach. First of all, all computation in the CNAPS is performed digitally. Secondly, both the activity of each PN and the interconnectivity between PNs are determined by a software program. The CNAPS provides greater flexibility at the price of speed in implementing embodiments of the current invention.

Implemented on the CNAPS, the input label site images are split up between a Unix host processor and CNAPS server memory. Portions of these images are transferred to the CNAPS' server memory as required. Between the server memory and the PNs yet smaller portions of the input and state label images are transferred to the PN's local memory. After executing the program that implements the neural equations, the PNs then write back to the server memory the updated label values. Finally, an updated subset of the state label image is transferred back to the Unix host. This cycle is repeated until the entire binary label is completed.

From the foregoing description of the preferred embodiment, other embodiments will suggest themselves to those skilled in the art. Therefore, the scope of the present invention should be limited only by the claims below and equivalents thereof.

What is claimed is:

1. A method of segmenting foreground areas from background areas of an input image including input pixels having grey scale input pixel values, comprising the steps of:

defining an output image comprising output pixels having binary output pixel values;

assigning each input pixel and each output pixel a position in a coordinate system so that the input image and the output image correspond to the physical configuration of the substrate;

assigning a scaling factor to each input pixel so that a scaling factor assigned to an input pixel represents an estimate of the background input pixel values in a neighborhood about the input pixel;

defining an energy function that varies as a function of the input pixels values, the output pixels values, and the scaling factors comprising a first component expressing a cost associated with an output pixel value not being in agreement with the value of a corresponding input pixel taking into account the value of the scaling factor assigned to the corresponding input pixel, a second component expressing a cost associated with the value of an output pixel not being in agreement with the values of pixels in a neighborhood around the output pixel, and a third component expressing a cost associated with the gradient of the input pixel values so as to define boundaries between regions of the input image having contrasting input pixel values; and segmenting foreground areas of the output image from background areas of the output image by iteratively varying the output pixel values so that the energy function converges toward a minimum value.

2. The method of claim 1, wherein the step of segmenting foreground areas of the output image from background areas of the output image comprises the step of growing foreground areas of the output image.

3. The method of claim 2, wherein the step of growing foreground areas of the output image comprises the steps of:

growing the foreground areas of the output image until the foreground areas intersect the boundaries; and shunting boundaries associated with changes in the scaling factors so that changes in the scaling factors do not prevent the growth of the foreground areas.

4. The method of claim 3, wherein the step of growing the foreground areas of the output image until the foreground areas intersect the boundaries comprises the step of assigning the energy function an energy penalty for foreground areas crossing boundaries.

5. The method of claim 4, wherein the step of assigning the energy function an energy penalty for foreground areas crossing boundaries comprises the step of assigning the energy function an energy penalty based on directional derivatives taken from the input image.

6. The method of claim 5, wherein the energy function further comprises:

a shunt inhibitor that counteracts the energy penalty for foreground areas of the output image crossing boundaries associated with changes in the scaling factors so that changes in the scaling factors do not prevent the growth of the foreground areas.

7. The method of claim 1, wherein the third component includes directional derivatives taken in directions relative to the coordinate system comprising:

a vertical direction;

a horizontal direction;

a plus forty-five degrees direction; and a minus forty-five degrees direction.

8. The method of claim 1, wherein the input pixels are in a one-to-one correspondence with the output pixels so that each output pixel has an associated input pixel.

9. An apparatus for segmenting foreground areas from background areas of an input image including input pixels having grey scale input pixel values, comprising:

a computer storage medium for defining an output image comprising output pixels having binary output pixel values;

means for assigning each input pixel and each output pixel a position in a coordinate system so that the input image and the output image correspond to the physical configuration of the substrate;

means for assigning a scaling factor to each input pixel so that a scaling factor assigned to an input pixel represents an estimate of the background input pixel values in a neighborhood about the input pixel;

means for defining an energy function that varies as a function of the input pixels values, the output pixels values, and the scaling factors comprising, a first component expressing a cost associated with an output pixel value not being in agreement the value of a corresponding input pixel taking into account the value of the scaling factor assigned to the corresponding input pixel, a second component expressing a cost associated with the value of an output pixel not being in agreement with the values of its neighboring output pixels, and a third component expressing a cost associated with the gradient of the input pixel values so as to define boundaries between regions of the input image having contrasting input pixel values; and means for segmenting foreground areas of the output image from background areas of the output image by iteratively varying the output pixel values so that the energy function converges toward a minimum value.

10. The apparatus of claim 9, wherein:

the means for assigning a scaling factor to each input pixel comprises a competitive learning network for assigning a scaling factor to each input pixel so that a scaling factor assigned to an input pixel represents an estimate of the background input pixel values in a neighborhood about the input pixel.

11. The apparatus of claim 9, wherein the means for segmenting foreground areas of the output image from background areas of the output image comprises:

means for growing foreground areas of the output image until the foreground areas intersect the boundaries; and means for shunting boundaries associated with changes in the scaling factors so that changes in the scaling factors do not prevent the growth of the foreground areas.

12. The apparatus of claim 11, wherein:

the means for segmenting foreground areas of the output image from background areas of the output image comprises a recurrent neural network for segmenting foreground areas of the output image from background areas of the output image by iteratively varying the output pixel values so that the energy function converges toward a minimum value.

* * * * *